United States Patent
Zhu et al.

(10) Patent No.: US 10,757,069 B2
(45) Date of Patent: Aug. 25, 2020

(54) IP ADDRESS ALLOCATION METHOD FOR MASTER-SLAVE NETWORK, APPARATUS, AND SYSTEM

(71) Applicant: HUAWEI TECHNOLOGIES CO., LTD., Shenzhen, Guangdong (CN)

(72) Inventors: Chong Zhu, Wuhan (CN); Xin Lv, Wuhan (CN); Jun Yang, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 46 days.

(21) Appl. No.: 15/764,270

(22) PCT Filed: Sep. 29, 2015

(86) PCT No.: PCT/CN2015/091125
§ 371 (c)(1),
(2) Date: Mar. 28, 2018

(87) PCT Pub. No.: WO2017/054140
PCT Pub. Date: Apr. 6, 2017

(65) Prior Publication Data
US 2018/0287993 A1    Oct. 4, 2018

(51) Int. Cl.
*G06F 15/16* (2006.01)
*G06F 15/173* (2006.01)
(Continued)

(52) U.S. Cl.
CPC .......... *H04L 61/2015* (2013.01); *H04L 29/12* (2013.01); *H04L 61/6068* (2013.01)

(58) Field of Classification Search
CPC .. H04L 29/12; H04L 61/2015; H04L 61/6068
(Continued)

(56) References Cited

U.S. PATENT DOCUMENTS 7,051,089 B1 * 5/2006 Johnson ............ H04L 29/12273
709/220
2007/0002833 A1  1/2007 Bajic
(Continued)

FOREIGN PATENT DOCUMENTS

CN    102025798 A    4/2011
CN    102098354 A    6/2011
(Continued)

OTHER PUBLICATIONS

Office Action issued in Japanese Application No. 2018-535215 dated Apr. 15, 2019, 7 pages (with English translation).
(Continued)

*Primary Examiner* — Karen C Tang
(74) *Attorney, Agent, or Firm* — Fish & Richardson P.C.

(57) ABSTRACT

The present invention provides an IP address allocation method for a master-slave network, an apparatus, and a system. A master device generates an IP address sub-segment group, and separately sends at least one IP address sub-segment in the IP address sub-segment group to at least one slave device, so that the slave device can use a received IP address sub-segment as a DHCP server address and allocate an IP address to a user device. In this way, the slave device can directly allocate the IP address to the user device, so that an IP address allocation time is reduced.

13 Claims, 9 Drawing Sheets

---

A slave device receives an IP address sub-segment sent by a master device, and uses the IP address sub-segment as a DHCP server address, where the IP address sub-segment includes at least one IP address — S601

↓

The slave device allocates an IP address to a user according to the DHCP server address — S602

(51) Int. Cl.
*H04L 29/12* (2006.01)
*G06F 15/177* (2006.01)

(58) Field of Classification Search
USPC .................. 709/224, 220, 229, 226, 223
See application file for complete search history.

(56) References Cited

U.S. PATENT DOCUMENTS

| | | | | |
|---|---|---|---|---|
| 2008/0151906 | A1* | 6/2008 | Kolli | H04L 12/2856 370/395.31 |
| 2009/0279520 | A1* | 11/2009 | Maki | H04W 12/06 370/338 |
| 2010/0299401 | A1* | 11/2010 | Lloyd | G06F 15/16 709/209 |
| 2012/0011230 | A1* | 1/2012 | Moreman | H04L 61/2015 709/220 |
| 2012/0215874 | A1 | 8/2012 | Sequeira et al. | |
| 2013/0044636 | A1* | 2/2013 | Koponen | H04L 47/12 370/254 |
| 2013/0091551 | A1* | 4/2013 | Rajakarunanayake | H04W 4/21 726/4 |
| 2013/0166776 | A1 | 6/2013 | Gao | |
| 2013/0326014 | A1* | 12/2013 | Niu | H04L 61/2061 709/217 |
| 2014/0344444 | A1 | 11/2014 | Wu et al. | |
| 2014/0344475 | A1* | 11/2014 | Chen | H04L 61/2015 709/245 |
| 2014/0362870 | A1* | 12/2014 | Huang | H04L 61/2061 370/437 |
| 2015/0156067 | A1 | 6/2015 | Tung et al. | |
| 2015/0281947 | A1* | 10/2015 | Patil | H04W 8/26 370/329 |
| 2015/0334696 | A1 | 11/2015 | Gu et al. | |
| 2015/0365911 | A1* | 12/2015 | Mohandas | H04W 56/001 370/338 |
| 2016/0127193 | A1* | 5/2016 | Deniaud | H04L 61/2046 709/208 |
| 2016/0315907 | A1* | 10/2016 | Nantel | H04L 61/2015 |
| 2017/0222877 | A1* | 8/2017 | Sagot | H04W 40/24 |
| 2018/0063072 | A1* | 3/2018 | Wackerly | H04L 61/103 |
| 2019/0179645 | A1* | 6/2019 | Prasad | G06F 9/4416 |

FOREIGN PATENT DOCUMENTS

| | | |
|---|---|---|
| CN | 102231725 A | 11/2011 |
| CN | 104158917 A | 11/2014 |
| CN | 104160655 A | 11/2014 |
| CN | 104243632 A | 12/2014 |
| CN | 104092790 B | 9/2017 |
| JP | 2005210554 A | 8/2005 |
| JP | 2009010803 A | 1/2009 |
| JP | 2013132051 A | 7/2013 |
| JP | 2014143697 A | 8/2014 |
| WO | 2014094937 A1 | 6/2014 |

OTHER PUBLICATIONS

Extended European Search Report issued in European Application No. 15905052.5 dated Jul. 30, 2018, 7 pages.
International Search Report issued in International Application No. PCT/CN2015/091125 dated Jul. 5, 2016, 13 pages.
Office Action issued in Chinese Application No. 201580082540.1 dated Aug. 2, 2019, 9 pages.
Examination Report issued in India Application No. 201837013203 dated Feb. 24, 2020, 8 pages.
Chao et al: "Hierarchical IP distribution mechanism for VANET,"2010 Second International Conference on Ubiquitous and Future Networks (ICUFN), IEEE, Piscataway, NJ, USA, XP031731523, Jun. 2010, p. 349-354.
EPO Communication pursuant to Article 94(3) EPC issued in European Application No. 15905052.5 dated Apr. 28, 2020, 5 pages.

* cited by examiner

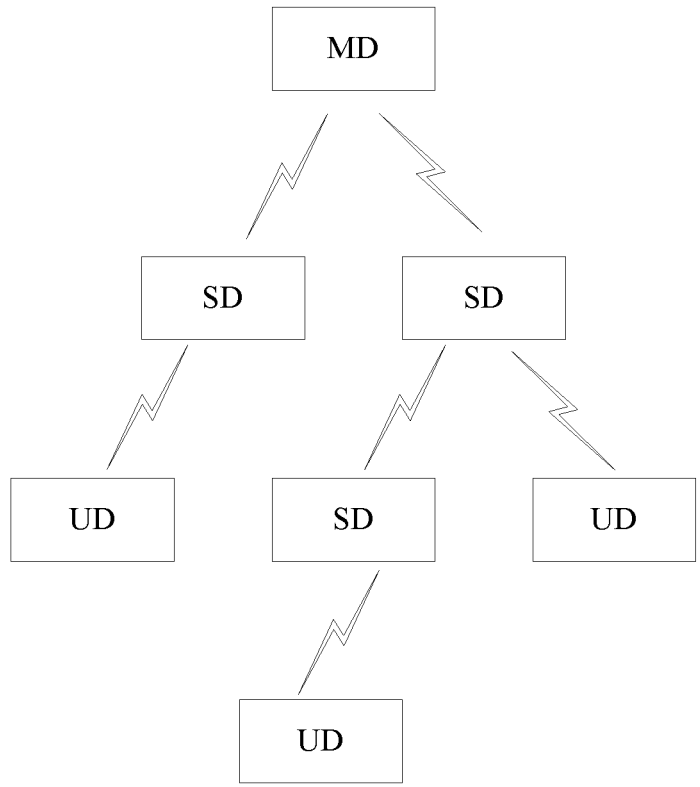

FIG. 1

A master device generates an IP address sub-segment group, where the IP address sub-segment group includes at least one IP address sub-segment, and each IP address sub-segment includes at least one IP address — S201

The master device separately sends the at least one IP address sub-segment in the IP address sub-segment group to at least one slave device, so that the at least one slave device uses the received IP address sub-segment as a DHCP server address, and allocates an IP address to a user device according to the DHCP server address — S202

FIG. 2

A master device sends a reclaiming message to at least one slave device, where the reclaiming message is used for requesting the slave device to return an IP address sub-segment required by the master device to the master device — S501

The master device receives a returning response message sent by the slave device according to the reclaiming message, where the returning response message carries identifiers of all or some of IP address sub-segments that are required by the master device and returned by the slave device, or the returning response message indicates that the slave device does not have the IP address sub-segment required by the master device — S502

FIG. 5

A slave device receives an IP address sub-segment sent by a master device, and uses the IP address sub-segment as a DHCP server address, where the IP address sub-segment includes at least one IP address — S601

The slave device allocates an IP address to a user according to the DHCP server address — S602

FIG. 6

IP ADDRESS ALLOCATION METHOD FOR MASTER-SLAVE NETWORK, APPARATUS, AND SYSTEM

CROSS-REFERENCE TO RELATED APPLICATION

This application is a National Stage of International Application No. PCT/CN2015/091125, filed on Sep. 29, 2015, which is hereby incorporated by reference in its entirety.

TECHNICAL FIELD

The present invention relates to the field of wireless communications technologies, and in particular, to an IP address allocation method for a master-slave network, an apparatus, and a system.

BACKGROUND

A master-slave network generally includes a master device (Master Device, MD for short), a slave device (Slave Device, SD for short), and a user device (User Device, UD for short). The MD is responsible for managing an SD that is homed to a management area, and when necessary, communicating and interacting with another MD based on a communications protocol between the MDs. The MD may also bear a service function of the SD, and provide a service outward. The SD cooperates with the MD to implement a service function, provides a service outward, and may provide a management signaling channel and a service forwarding channel for a next-level SD. The UD may be connected to an autonomous network to obtain a service.

In the master-slave network, the UD first needs to obtain an IP address before obtaining a service from the autonomous network. Generally, the MD centrally manages all Internet Protocol (Internet Protocol, IP for short) address allocation. After receiving a Dynamic Host Configuration Protocol (Dynamic Host Configuration Protocol, DHCP for short) IP request of the UD, the SD transparently transmits the request to the MD level by level. Then the MD allocates an IP address to the UD based on the request, and transparently transmits the allocated address to the UD level by level.

However, current IP address allocation has an excessively long delay, and consequently communication efficiency of the master-slave network is low.

SUMMARY

The present invention provides an IP address allocation method for a master-slave network, an apparatus, and a system, to improve communication efficiency of the master-slave network.

A first aspect of the embodiments of the present invention provides an IP address allocation method for a master-slave network, where the master-slave network includes a master device and at least one slave device in a management area of the master device, and the method includes:

generating, by the master device, an Internet Protocol IP address sub-segment group, where the IP address sub-segment group includes at least one IP address sub-segment, and each IP address sub-segment includes at least one IP address; and separately sending, by the master device, the at least one IP address sub-segment in the IP address sub-segment group to the at least one slave device, so that the at least one slave device uses the received IP address sub-segment as a Dynamic Host Configuration Protocol DHCP server address, and allocates an IP address to a user device according to the DHCP server address.

With reference to the first aspect, in a first possible implementation of the first aspect, before the separately sending, by the master device, the at least one IP address sub-segment in the IP address sub-segment group to the at least one slave device, the method further includes:

receiving, by the master device, an IP address sub-segment request message sent by the slave device, where the IP address sub-segment request message is used for requesting the master device to allocate N IP address sub-segments to the slave device, and N is a positive integer; and if there are N allocatable IP address sub-segments in the IP address sub-segment group, obtaining, by the master device, the N IP address sub-segments from the allocatable IP address sub-segments; or if there are no N allocatable IP address sub-segments in the IP address sub-segment group, reclaiming, by the master device, an allocatable IP address sub-segment from another slave device in the management area of the master device until there are N allocatable IP address sub-segments in the IP address sub-segment group, and obtaining, by the master device, the N IP address sub-segments from the allocatable IP address sub-segments.

With reference to the first aspect, in a second possible implementation of the first aspect, before the separately sending, by the master device, the at least one IP address sub-segment in the IP address sub-segment group to the at least one slave device, the method further includes:

receiving, by the master device, a specific IP address sub-segment request message sent by the slave device, where the IP address sub-segment request message carries an identifier of a specific IP address sub-segment required by the slave device, and is used for requesting the master device to allocate the specific IP address sub-segment to the slave device; and if there is the specific IP address sub-segment in an allocatable IP address sub-segment in the IP address sub-segment group, obtaining, by the master device, the specific IP address sub-segment; or if there is not the specific IP address sub-segment in an allocatable IP address sub-segment in the IP address sub-segment group, reclaiming, by the master device, the specific IP address sub-segment from another slave device in the management area of the master device, and obtaining, by the master device, the reclaimed specific IP address sub-segment.

With reference to the first or the second possible implementation of the first aspect, in a third possible implementation of the first aspect, the method further includes:

sending, by the master device, a reclaiming message to the at least one slave device, where the reclaiming message is used for requesting the slave device to return the IP address sub-segment required by the master device to the master device; and receiving, by the master device, a returning response message sent by the slave device according to the reclaiming message, where the returning response message carries identifiers of all or some of IP address sub-segments that are required by the master device and returned by the slave device, or the returning response message indicates that the slave device does not have the IP address sub-segment required by the master device.

A second aspect of the embodiments of the present invention provides an IP address allocation method for a master-slave network, where the master-slave network includes a master device and at least one slave device in a management area of the master device, and the method includes:

receiving, by the slave device, an IP address sub-segment sent by the master device, and using the IP address sub-segment as a Dynamic Host Configuration Protocol DHCP server address, where the IP address sub-segment includes at least one IP address; and allocating, by the slave device, an IP address to a user device according to the DHCP server address.

With reference to the second aspect, in a first possible implementation of the second aspect, before the receiving, by the slave device, an IP address sub-segment sent by the master device, the method further includes:

sending, by the slave device, an IP address sub-segment request message to the master device, where the IP address sub-segment request message is used for requesting the master device to allocate N IP address sub-segments to the slave device, and N is a positive integer.

With reference to the second aspect, in a second possible implementation of the second aspect, before the receiving, by the slave device, an IP address sub-segment sent by the master device, the method further includes:

sending, by the slave device, a specific IP address sub-segment request message to the master device, where the IP address sub-segment request message carries an identifier of a specific IP address sub-segment required by the slave device, and is used for requesting the master device to allocate the specific IP address sub-segment to the slave device.

With reference to the first or the second possible implementation of the second aspect, in a third possible implementation of the second aspect, the method further includes:

receiving, by the slave device, a reclaiming message sent by the master device, where the reclaiming message is used for requesting the slave device to return the IP address sub-segment required by the master device to the master device;

querying, by the slave device, whether the DHCP server address includes the IP address sub-segment required by the master device; and if the DHCP server address includes all or some of IP address sub-segments required by the master device, sending, by the slave device, a returning response message to the master device, where the returning response message carries identifiers of all or some of the IP address sub-segments that are included in the DHCP server address and required by the master device; or if the DHCP server address does not include the IP address sub-segment required by the master device, sending, by the slave device, a returning response message to the master device, where the returning response message notifies the master device that the slave device does not have the IP address sub-segment required by the master device.

With reference to any one of the second aspect or the first to the third possible implementations of the second aspect, in a fourth possible implementation of the second aspect, the method further includes:

receiving, by the slave device, a request message sent by the user device, where the request message is used for requesting the slave device to allocate the IP address to the user device.

A third aspect of the embodiments of the present invention provides a master device, where the master device belongs to a master-slave network, the master-slave network includes the master device and at least one slave device in a management area of the master device, and the master device includes:

a generation module, configured to generate an Internet Protocol IP address sub-segment group, where the IP address sub-segment group includes at least one IP address sub-segment, and each IP address sub-segment includes at least one IP address; and a sending module, configured to separately send the at least one IP address sub-segment in the IP address sub-segment group to the at least one slave device, so that the at least one slave device uses the received IP address sub-segment as a Dynamic Host Configuration Protocol DHCP server address, and allocates an IP address to a user device according to the DHCP server address.

With reference to the third aspect, in a first possible implementation of the third aspect, the master device further includes a first receiving module and a first obtaining module;

the first receiving module is configured to: before the sending module separately sends the at least one IP address sub-segment in the IP address sub-segment group to the at least one slave device, receive an IP address sub-segment request message sent by the slave device, where the IP address sub-segment request message is used for requesting the master device to allocate N IP address sub-segments to the slave device, and N is a positive integer; and the first obtaining module is configured to: if there are N allocatable IP address sub-segments in the IP address sub-segment group, obtain the N IP address sub-segments from the allocatable IP address sub-segments; or if there are no N allocatable IP address sub-segments in the IP address sub-segment group, reclaim an allocatable IP address sub-segment from another slave device in the management area of the master device until there are N allocatable IP address sub-segments in the IP address sub-segment group, and obtain the N IP address sub-segments from the allocatable IP address sub-segments.

With reference to the third aspect, in a second possible implementation of the third aspect, the master device further includes a second receiving module and a second obtaining module;

the second receiving module is configured to: before the sending module separately sends the at least one IP address sub-segment in the IP address sub-segment group to the at least one slave device, receive a specific IP address sub-segment request message sent by the slave device, where the IP address sub-segment request message carries an identifier of a specific IP address sub-segment required by the slave device, and is used for requesting the master device to allocate the specific IP address sub-segment to the slave device; and the second obtaining module is configured to: if there is the specific IP address sub-segment in an allocatable IP address sub-segment in the IP address sub-segment group, obtain the specific IP address sub-segment; or if there is not the specific IP address sub-segment in an allocatable IP address sub-segment in the IP address sub-segment group, reclaim the specific IP address sub-segment from another slave device in the management area of the master device, and obtain the reclaimed specific IP address sub-segment.

With reference to the first or the second possible implementation of the third aspect, in a third possible implementation of the third aspect, the master device further includes a third receiving module;

the sending module is further configured to send a reclaiming message to the at least one slave device, where the reclaiming message is used for requesting the slave device to return the IP address sub-segment required by the master device to the master device; and the third receiving module is configured to receive a returning response message sent by the slave device according to the reclaiming message, where the returning response message carries identifiers of all or some of IP address sub-segments that are required by the master device and returned by the slave device, or the returning response message indicates that the slave device does not have the IP address sub-segment required by the master device.

A fourth aspect of the embodiments of the present invention provides a slave device, where the master device belongs to a master-slave network, the master-slave network includes a master device and at least one slave device in a management area of the master device, and the slave device includes:

a receiving module, configured to: receive an IP address sub-segment sent by the master device, and use the IP address sub-segment as a Dynamic Host Configuration Protocol DHCP server address, where the IP address sub-segment includes at least one IP address; and an allocation module, configured to allocate an IP address to a user device according to the DHCP server address.

With reference to the fourth aspect, in a first possible implementation of the fourth aspect, the slave device further includes a first sending module;

the first sending module is configured to: before the receiving module receives the IP address sub-segment sent by the master device, send an IP address sub-segment request message to the master device, where the IP address sub-segment request message is used for requesting the master device to allocate N IP address sub-segments to the slave device, and N is a positive integer.

With reference to the fourth aspect, in a second possible implementation of the fourth aspect, the slave device further includes a second sending module;

the second sending module is configured to: before the receiving module receives the IP address sub-segment sent by the master device, send a specific IP address sub-segment request message to the master device, where the IP address sub-segment request message carries an identifier of a specific IP address sub-segment required by the slave device, and is used for requesting the master device to allocate the specific IP address sub-segment to the slave device.

With reference to the first or the second possible implementation of the fourth aspect, in a third possible implementation of the fourth aspect, the slave device further includes a query module a third sending module;

the receiving module is further configured to receive a reclaiming message sent by the master device, where the reclaiming message is used for requesting the slave device to return the IP address sub-segment required by the master device to the master device;

the query module is configured to query whether the DHCP server address includes the IP address sub-segment required by the master device; and the third sending module is configured to: if the DHCP server address includes all or some of IP address sub-segments required by the master device, send a returning response message to the master device, where the returning response message carries identifiers of all or some of the IP address sub-segments that are included in the DHCP server address and required by the master device; or if the DHCP server address does not include the IP address sub-segment required by the master device, send a returning response message to the master device, where the returning response message notifies the master device that the slave device does not have the IP address sub-segment required by the master device.

With reference to any one of the fourth aspect to the third possible implementation of the fourth aspect, in a fourth possible implementation of the fourth aspect, the receiving module is further configured to receive a request message sent by the user device, where the request message is used for requesting the slave device to allocate the IP address to the user device.

A fifth aspect of the embodiments of the present invention provides a master device, where the master device belongs to a master-slave network, the master-slave network includes the master device and at least one slave device in a management area of the master device, and the master device includes:

a processor, configured to generate an Internet Protocol IP address sub-segment group, where the IP address sub-segment group includes at least one IP address sub-segment, and each IP address sub-segment includes at least one IP address; and a transmitter, configured to separately send the at least one IP address sub-segment in the IP address sub-segment group to the at least one slave device, so that the at least one slave device uses the received IP address sub-segment as a Dynamic Host Configuration Protocol DHCP server address, and allocates an IP address to a user device according to the DHCP server address.

With reference to the fifth aspect, in a first possible implementation of the fifth aspect, the master device further includes a receiver, configured to: before the transmitter separately sends the at least one IP address sub-segment in the IP address sub-segment group to the at least one slave device, receive an IP address sub-segment request message sent by the slave device, where the IP address sub-segment request message is used for requesting the master device to allocate N IP address sub-segments to the slave device, and N is a positive integer; and the processor is configured to: if there are N allocatable IP address sub-segments in the IP address sub-segment group, obtain the N IP address sub-segments from the allocatable IP address sub-segments; or if there are no N allocatable IP address sub-segments in the IP address sub-segment group, reclaim an allocatable IP address sub-segment from another slave device in the management area of the master device until there are N allocatable IP address sub-segments in the IP address sub-segment group, and obtain the N IP address sub-segments from the allocatable IP address sub-segments.

With reference to the fifth aspect, in a second possible implementation of the fifth aspect, the master device further includes a receiver, configured to: before the transmitter separately sends the at least one IP address sub-segment in the IP address sub-segment group to the at least one slave device, receive a specific IP address sub-segment request message sent by the slave device, where the IP address sub-segment request message carries an identifier of a specific IP address sub-segment required by the slave device, and is used for requesting the master device to allocate the specific IP address sub-segment to the slave device; and the processor is configured to: if there is the specific IP address sub-segment in an allocatable IP address sub-segment in the IP address sub-segment group, obtain the specific IP address sub-segment; or if there is not the specific IP address sub-segment in an allocatable IP address sub-segment in the IP address sub-segment group, reclaim the specific IP address sub-segment from another slave device in the management area of the master device, and obtain the reclaimed specific IP address sub-segment.

With reference to the first or the second possible implementation of the fifth aspect, in a third possible implementation of the fifth aspect, the transmitter is further configured to send a reclaiming message to the at least one slave device, where the reclaiming message is used for requesting the slave device to return the IP address sub-segment required by the master device to the master device; and the receiver is further configured to receive a returning response message sent by the slave device according to the reclaiming message, where the returning response message carries identifiers of all or some of IP address sub-segments that are required by the master device and returned by the slave device, or the returning response message indicates that the slave device does not have the IP address sub-segment required by the master device.

A sixth aspect of the embodiments of the present invention provides a slave device, where the master device belongs to a master-slave network, the master-slave network includes a master device and at least one slave device in a management area of the master device, and the slave device includes:

a receiver, configured to: receive an IP address sub-segment sent by the master device, and use the IP address sub-segment as a Dynamic Host Configuration Protocol DHCP server address, where the IP address sub-segment includes at least one IP address; and a processor, configured to allocate an IP address to a user device according to the DHCP server address.

With reference to the sixth aspect, in a first possible implementation of the sixth aspect, the slave device further includes a transmitter, configured to: before the receiver receives the IP address sub-segment sent by the master device, send an IP address sub-segment request message to the master device, where the IP address sub-segment request message is used for requesting the master device to allocate N IP address sub-segments to the slave device, and N is a positive integer.

With reference to the sixth aspect, in a second possible implementation of the sixth aspect, the slave device further includes a transmitter, configured to: before the receiver receives the IP address sub-segment sent by the master device, send a specific IP address sub-segment request message to the master device, where the IP address sub-segment request message carries an identifier of a specific IP address sub-segment required by the slave device, and is used for requesting the master device to allocate the specific IP address sub-segment to the slave device.

With reference to the first or the second possible implementation of the sixth aspect, in a third possible implementation of the sixth aspect, the receiver is further configured to receive a reclaiming message sent by the master device, where the reclaiming message is used for requesting the slave device to return the IP address sub-segment required by the master device to the master device;

the processor is further configured to query whether the DHCP server address includes the IP address sub-segment required by the master device; and the transmitter is further configured to: if the DHCP server address includes all or some of IP address sub-segments required by the master device, send a returning response message to the master device, where the returning response message carries identifiers of all or some of the IP address sub-segments that are included in the DHCP server address and required by the master device; or if the DHCP server address does not include the IP address sub-segment required by the master device, send a returning response message to the master device, where the returning response message notifies the master device that the slave device does not have the IP address sub-segment required by the master device.

With reference to any one of the sixth aspect to the third possible implementation of the sixth aspect, in a fourth possible implementation of the sixth aspect, the receiver is further configured to receive a request message sent by the user device, where the request message is used for requesting the slave device to allocate the IP address to the user device.

According to the IP address allocation method for a master-slave network, the apparatus, and the system that are provided in the embodiments of the present invention, the master device generates the IP address sub-segment group, and separately sends the at least one IP address sub-segment in the IP address sub-segment group to the at least one slave device, so that the slave device can use the received IP address sub-segment as the DHCP server address and allocate the IP address to the user device according to the DHCP server address. In this way, the slave device can directly allocate the IP address to the user device, so that an IP address allocation time is greatly reduced, and communication efficiency of the master-slave network is improved.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

FIG. 1 is a schematic architecture diagram of a master-slave network according to an embodiment of the present invention;

FIG. 2 is a schematic flowchart of Embodiment 1 of an IP address allocation method for a master-slave network according to the present invention;

FIG. 5 is a schematic flowchart of Embodiment 4 of an IP address allocation method for a master-slave network according to the present invention;

FIG. 6 is a schematic flowchart of Embodiment 5 of an IP address allocation method for a master-slave network according to the present invention;

DESCRIPTION OF EMBODIMENTS

Figure 3:
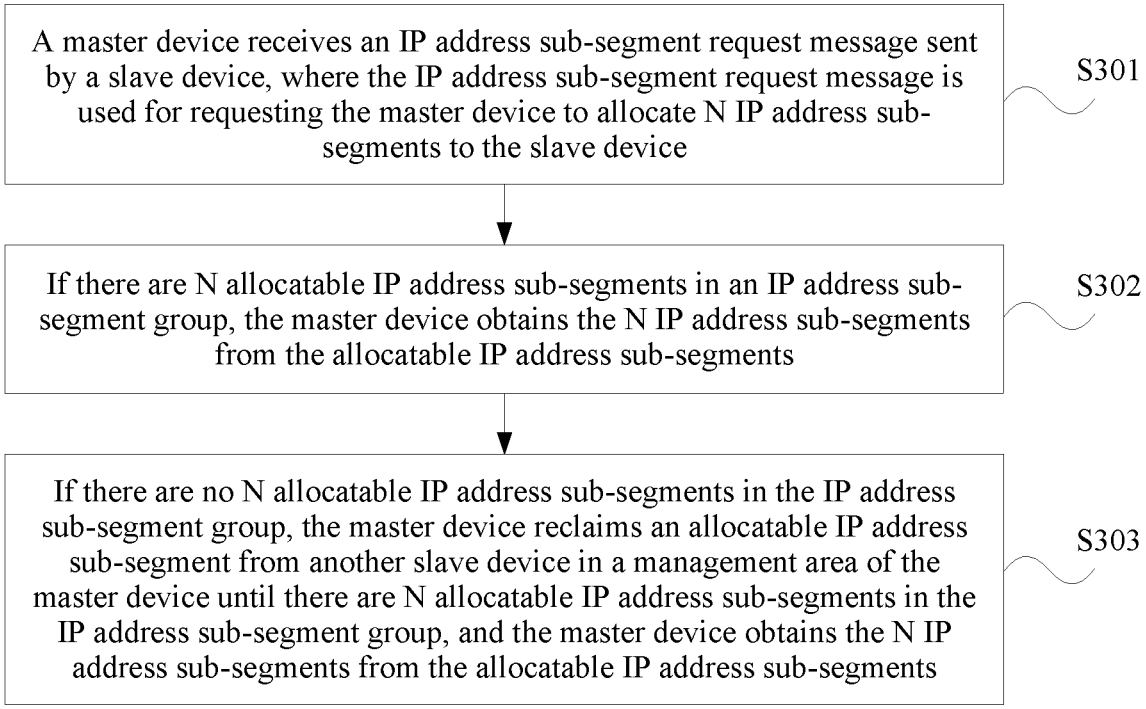
FIG. 3 is a schematic flowchart of Embodiment 2 of an IP address allocation method for a master-slave network according to the present invention.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

FIG. 1 is a schematic architecture diagram of a master-slave network according to an embodiment of the present invention. Referring to FIG. 1, the master-slave network includes a master device (Master Device, MD for short), at least one slave device (Slave Device, SD for short) in a management area of the master device, and at least one user device (User Device, UD for short).

Functions of the MD are: managing the slave device that belongs to the management area, and when necessary, communicating and interacting with another master device based on a communications protocol between the master devices. A greatest improvement of the MD provided in the embodiments of the present invention on a prior-art MD is: The MD provided in the embodiments of the present invention can divide an IP address segment into a plurality of IP address sub-segments, and separately allocate different IP address sub-segments to different SDs. Further, the MD can reallocate and reclaim an IP address by dynamically configuring the IP address.

Functions of the SD are: cooperating with the master device to implement a service function, providing a service outward, and providing a management signaling channel and a service forwarding channel for a next-level slave device. A greatest improvement of the SD provided in the embodiments of the present invention on a prior-art SD is: The SD provided in the embodiments of the present invention supports the DHCP protocol, can establish a DHCP server address pool according to an IP address sub-segment allocated by the MD, and directly allocates an IP address to the UD, thereby avoiding transparent transmission of an IP address request level by level when allocating the IP address to the UD. Therefore, an unnecessary interaction procedure is reduced in a configuration process, a delay is reduced, and communication efficiency of the master-slave network is improved. Further, corresponding to dynamically adjusting the IP address sub-segment by the MD, the SD also has a function of managing, maintaining, and updating the DHCP server address pool.

It should be noted that the schematic architecture diagram shown in FIG. 1 is merely an example. The MD and another MD may also communicate with each other by using a protocol, and the UD may also be directly connected to the MD. A deployment structure of a system for configuring an IP address in the master-slave network is not specifically limited herein.

The MD and the SD provided in the embodiments of the present invention are described in detail below by using specific embodiments.

FIG. 2 is a schematic flowchart of Embodiment 1 of an IP address allocation method for a master-slave network according to the present invention. The method is performed by an MD in the foregoing master-slave network. Referring to FIG. 2, the method includes the following steps.

S201. A master device generates an IP address sub-segment group, where the IP address sub-segment group includes at least one IP address sub-segment, and each IP address sub-segment includes at least one IP address.

That is, the master device divides an IP address into a plurality of IP address sub-segments, and then groups the plurality of IP address sub-segments into the IP address sub-segment group.

S202. The master device separately sends the at least one IP address sub-segment in the IP address sub-segment group to at least one slave device, so that the at least one slave device uses the received IP address sub-segment as a DHCP server address, and allocates an IP address to a user device according to the DHCP server address.

Specifically, the MD allocates the IP address sub-segment to a slave device in a management area. In this embodiment of the present invention, the slave device supports the DHCP protocol, and after receiving the IP address sub-segment sent by the master device, the slave device may establish a DHCP server address pool to accommodate the DHCP server address, so as to allocate the IP address to the user device according to a requirement of the user device.

It should be noted that when there are a plurality of SDs in the management area of the MD in the master-slave network, IP address sub-segments allocated by the MD to the SDs are mutually different. The MD marks an allocated IP address sub-segment in the IP address sub-segment group as allocated.

In this embodiment, the master device generates the IP address sub-segment group, and separately sends the at least one IP address sub-segment in the IP address sub-segment group to the at least one slave device, so that the slave device can use the received IP address sub-segment as the DHCP server address and allocate the IP address to the user device according to the DHCP server address. In this way, the slave device can directly allocate the IP address to the user device, so that an IP address allocation time is greatly reduced, and communication efficiency of the master-slave network is improved.

In some cases, the master device receives an IP address sub-segment request that is actively sent by the slave device in the management area, that is, the slave device actively requests the master device to allocate an IP address sub-segment.

FIG. 3 is a schematic flowchart of Embodiment 2 of an IP address allocation method for a master-slave network according to the present invention. As shown in FIG. 3, before the separately sending, by the master device, the at least one IP address sub-segment in the IP address subsegment group to at least one slave device, the method may further include the following steps.

S301. The master device receives an IP address sub-segment request message sent by the slave device, where the IP address sub-segment request message is used for requesting the master device to allocate N IP address sub-segments to the slave device.

N is a positive integer.

The slave device herein may be any slave device that has an IP address allocation requirement in the master-slave network.

After receiving the IP address sub-segment request message, the master device checks an allocatable IP address sub-segment in the IP address sub-segment group of the master device. The allocatable IP address sub-segment herein is an IP address sub-segment that has not been allocated to the slave device.

S302. If there are N allocatable IP address sub-segments in the IP address sub-segment group, the master device obtains the N IP address sub-segments from the allocatable IP address sub-segments, so that the master device can allocate the N IP address sub-segments to the slave device.

It should be noted that the master device determines whether there are, in the allocatable IP address sub-segments in the IP address sub-segment group, the N IP address sub-segments requested by the slave device, and an IP address sub-segment that has been allocated to the slave device is not in a determining range.

Specifically, the master device may preset a preset threshold k of the allocatable IP address sub-segments, that is, the master device retains at least k IP address sub-segments, so as to meet a requirement of the slave device in time. That is, if a slave device requests the master device to allocate N IP address sub-segments, the master device has at least N+k allocatable IP address sub-segments, and if a quantity of allocatable IP address sub-segments on the master device is less than N+k, the master device needs to reclaim an IP address sub-segment from another slave device before allocating the IP address sub-segment, where k is a positive integer greater than or equal to 0.

S303. If there are no N allocatable IP address sub-segments in the IP address sub-segment group, the master device reclaims an allocatable IP address sub-segment from another slave device in a management area of the master device until there are N allocatable IP address sub-segments in the IP address sub-segment group, and the master device obtains the N IP address sub-segments from the allocatable IP address sub-segments.

Then, the master device may allocate the N IP address sub-segments to the slave device. If the master device has set the threshold k, the master device needs to reclaim the allocated IP address sub-segments from another slave device, and the master device may divide the reclaimed IP address sub-segments, to update or generate the IP address sub-segment group until there are N+k allocatable IP address sub-segments in the IP address sub-segment group of the master device.

Specifically, it is assumed that the master device can randomly request to reclaim M allocatable IP address sub-segments from a slave device in the management area. If there are only m allocatable IP address sub-segments on the slave device, and m is less than M, the slave device returns the m allocatable IP address sub-segments to the master device, then the master device requests to reclaim M-m allocatable IP address sub-segments from another slave device, and the rest may be deduced by analogy until a quantity of allocatable IP address sub-segments in the IP address sub-segment group minus the preset threshold is greater than or equal to N.

Figure 4:
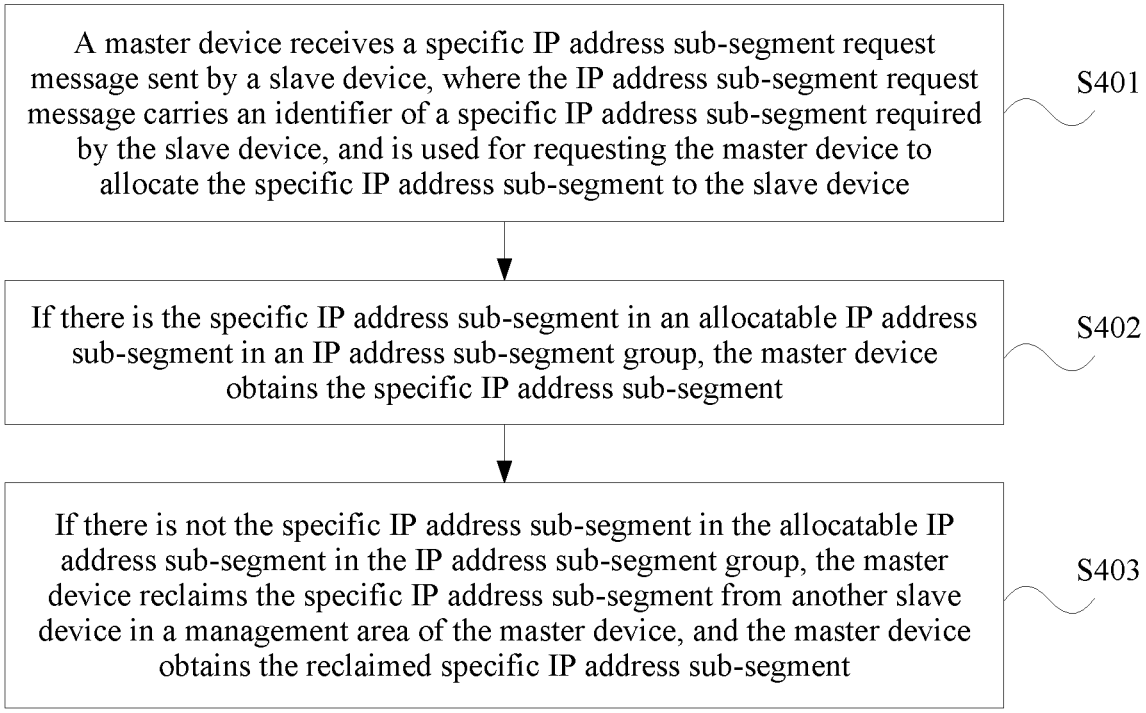
FIG. 4 is a schematic flowchart of Embodiment 3 of an IP address allocation method for a master-slave network according to the present invention.

FIG. 4 is a schematic flowchart of Embodiment 3 of an IP address allocation method for a master-slave network according to the present invention. As shown in FIG. 4, based on the embodiment in FIG. 2, before the separately sending, by the master device, the at least one IP address sub-segment in the IP address sub-segment group to at least one slave device, the method may further include the following steps.

S401. The master device receives a specific IP address sub-segment request message sent by the slave device, where the IP address sub-segment request message carries an identifier of a specific IP address sub-segment required by the slave device, and is used for requesting the master device to allocate the specific IP address sub-segment to the slave device.

That is, in this case, the slave device requests the master device to allocate some specific IP address sub-segments, and the slave device may add identifiers of the specific IP address sub-segments to the IP address sub-segment request message, so as to notify the master device of the requested IP address sub-segments.

After receiving the specific IP address sub-segment request message, the master device checks an allocatable IP address sub-segment of the master device, to find whether there is the specific IP address sub-segment.

S402. If there is the specific IP address sub-segment in an allocatable IP address sub-segment in the IP address sub-segment group, the master device obtains the specific IP address sub-segment, so that the master device can allocate the specific IP address sub-segment to the slave device.

S403. If there is not the specific IP address sub-segment in the allocatable IP address sub-segment in the IP address sub-segment group, the master device reclaims the specific IP address sub-segment from another slave device in a management area of the master device, and the master device obtains the reclaimed specific IP address sub-segment, so that the reclaimed specific IP address sub-segment can be allocated to the first slave device.

Specifically, it is assumed that the master device can randomly request to reclaim the specific IP address sub-segment from a slave device in the management area. If the slave device has the specific IP address sub-segment, the slave device returns the specific IP address sub-segment to the master device, and the master device may allocate the reclaimed specific IP address sub-segment to the slave device that requests the specific IP address sub-segment. If the slave device from which the master device requests to reclaim the specific IP address sub-segment does not have the specific IP address sub-segment, the slave device notifies the master device that the slave device does not have the specific IP address sub-segment, and then the master device reclaims the specific IP address sub-segment from another slave device. In a reclaiming process, a slave device that has the specific IP address sub-segment may refuse to return the specific IP address sub-segment to the master device. In this case, the master device cannot allocate the specific IP address sub-segment to the slave device that requests the specific IP address sub-segment, and a procedure ends. Alternatively, the master device may notify the slave device that the master device does not have the specific IP address sub-segment.

It can be learned from the foregoing embodiment that, in some cases, the master device needs to reclaim a previously allocated IP address sub-segment from the slave device in the management area. For example, (1) when an IP address sub-segment of the MD cannot meet a requirement of a new IP address apply request or a new IP address sub-segment apply request, the MD requests the SD to newly add an IP address sub-segment, or the SD requests to occupy an IP address that has been allocated to another UD; (2) the MD periodically triggers reclaiming of an allocatable IP address from each SD, or each SD periodically reports an allocatable IP address to the MD. Certainly, the present invention is not limited to the foregoing cases.

FIG. 5 is a schematic flowchart of Embodiment 4 of an IP address allocation method for a master-slave network according to the present invention. As shown in FIG. 5, the method includes the following steps.

S501. The master device sends a reclaiming message to the at least one slave device, where the reclaiming message is used for requesting the slave device to return the IP address sub-segment required by the master device to the master device.

Alternatively, in some cases, the reclaiming message is further used for requesting the slave device to return an IP address required by the master device to the master device.

The master device may randomly send the reclaiming message to one of the at least one slave device. If the slave device does not have the IP address sub-segment required by the master device, or has only some IP address sub-segments, the master device reclaims the IP address sub-segment from another slave device, and the like.

S502. The master device receives a returning response message sent by the slave device according to the reclaiming message, where the returning response message carries identifiers of all or some of IP address sub-segments that are required by the master device and returned by the slave device, or the returning response message indicates that the slave device does not have the IP address sub-segment required by the master device.

Specifically, there are the following two common cases, but the present invention is not limited thereto.

(1) The reclaiming message carries an identifier of at least one IP address sub-segment that needs to be reclaimed by the master device. That is, a specific IP address sub-segment that needs to be reclaimed by the master device is indicated in the reclaiming message.

In this case, the master device receives the returning response message sent by the slave device according to the reclaiming message, and the returning response message carries identifiers of all or some of the at least one IP address sub-segment that needs to be reclaimed by the master device and that is returned by the slave device. Alternatively, the returning response message indicates that the first slave device has no IP address sub-segment that can be returned.

For example, the master device needs to reclaim three IP address sub-segments: an IP address sub-segment A, an IP address sub-segment B, and an IP address sub-segment C. If the slave device has none of the three IP address sub-segments, the slave device indicates, in the returning response message, that the slave device has no IP address sub-segment that can be returned. If the slave device has the three IP address sub-segments, the slave device may add identifiers of the three IP address sub-segments to the returning response message. Alternatively, when the slave device has the IP address sub-segment A among the three IP address sub-segments, the slave device may add an identifier of the IP address sub-segment A to the returning response message. Certainly, if the slave device has allocated the IP address sub-segment A to a UD or uses the IP address sub-segment A for another purpose, the slave device may keep the IP address sub-segment A, and notify the master device that the IP address sub-segment A is not returned.

In some special cases, the master device may need to reclaim an IP address sub-segment that includes a specific IP address, and the reclaiming message carries an identifier of the specific IP address. If the slave device happens to have the IP address sub-segment that includes the IP address, the slave device may directly return, by using the returning response message, the IP address sub-segment that includes the IP address. If the slave device has the IP address, but an original IP address sub-segment in which the IP address is located does not exist, the slave device may return only the IP address by using the returning response message, and the master device generates a new IP address sub-segment according to the IP address.

(2) The reclaiming message carries a quantity N of IP address sub-segments that need to be reclaimed by the master device, where N is a positive integer. That is, the master device indicates only the quantity of IP address sub-segments that need to be reclaimed, and does not require a specific IP address sub-segment.

Correspondingly, the master device receives the returning response message sent by the slave device according to the reclaiming message, the returning response message carries identifiers of n IP address sub-segments returned by the slave device, where n is a positive integer less than or equal to N. Alternatively, the returning response message indicates that the slave device has no IP address sub-segment that can be returned.

The slave device may specifically determine a quantity of returned IP address sub-segments according to a quantity of allocatable IP address sub-segments on the slave device. The slave device may set the quantity of allocatable IP address sub-segments on the slave device to be no less than k, where k is greater than or equal to 0. For example, if the slave device has M allocatable IP address sub-segments, and M is greater than k, the slave device may return a maximum of M-k IP address sub-segments to the master device. If the quantity of allocatable IP address sub-segments on the slave device is less than or equal to k, it indicates that the slave device has no IP address sub-segment that can be returned.

Certainly, the master device may also send only the reclaiming message to the slave device, that is, indicates neither a quantity of to-be-reclaimed IP address sub-segments nor an identifier of a specific IP address sub-segment. In this case, the slave device may return one or more allocatable IP address sub-segments or one or more allocatable IP addresses to the master device according to a status of the slave device.

Based on the foregoing embodiment, for a case in which the returning response message indicates that the slave device has no IP address sub-segment that can be returned, the master device sends the reclaiming message to a slave device in the management area other than the foregoing slave device, and the reclaiming message is used for requesting the slave device to return the IP address sub-segment required by the master device to the master device, and the rest may be deduced by analogy until the master device reclaims the required IP address sub-segment.

In addition, for a case in which the returning response message carries identifiers of some IP address sub-segments that are required by the master device and returned by the slave device, the master device may further send the reclaiming message to a slave device in the management area other than the foregoing slave device, and the reclaiming message is used for requesting the slave device to return a remaining IP address sub-segment required by the master device to the master device. The remaining IP address sub-segment is an IP address sub-segment, other than the some IP address sub-segments returned by the slave device, in the IP address sub-segment required by the master device. For example, the master device requests ten IP address sub-segments from a first slave device, the first slave device returns six IP address sub-segments to the master device, then the master device requests to reclaim four IP address sub-segments from a second slave device, the second slave device determines, in a manner the same as that of the first slave device, a quantity of IP address sub-segments that can be returned, and if the master device still has not reclaimed ten IP address sub-segments, the master device may continue to request an IP address sub-segment from another slave device until ten IP address sub-segments are obtained. Likewise, the master device may also separately reclaim a plurality of specific IP address sub-segments from different slave devices.

The master device may randomly select a slave device, so as to reclaim the IP address sub-segment. This is not limited herein. Certainly, to better improve IP address allocation efficiency, each slave device may be preset to periodically report a status of a DHCP server address maintained by the slave device. Specifically, a message periodically reported by each slave device may include information about an allocatable IP address in a DHCP server address pool, a total quantity of allocatable IP addresses, and the like. When reclaiming the IP address sub-segment, the master device may perform selection based on the message reported by the slave device. Certainly, if the slave device is not preset to periodically perform reporting, the master device may periodically send a query message to the slave device. The query message is used for requesting the slave device to report a status of a DHCP server address maintained by the slave device.

In this embodiment of the present invention, in some cases such as a case in which the master device is directly connected to the user device, the master device may further directly allocate an IP address sub-segment to the user device. Specifically, the master device may send an IP address sub-segment, in the IP address sub-segment group, of the user device to the user device. The IP address of the user device is at least one IP address sub-segment in the IP address sub-segment group. In a specific implementation process, the MD may use at least one IP address sub-segment in the generated IP address sub-segment group as the IP address sub-segment of the user device, so as to allocate the IP address to the UD.

The same as the case in which the reclaiming message is sent to the slave device, in some cases, after the master device sends the IP address sub-segment, in the IP address sub-segment group, of the user device to the user device, the master device may further send a reclaiming message to the user device. The reclaiming message is used for requesting the user device to return the IP address sub-segment required by the master device to the master device. For a specific reclaiming manner, refer to the foregoing slave device. Details are not described herein again.

FIG. 6 is a schematic flowchart of Embodiment 5 of an IP address allocation method for a master-slave network according to the present invention. The method is performed by a slave device, the slave device may be any slave device in the management area of the master device, and the slave device supports the DHCP protocol.

As shown in FIG. 6, the method includes the following steps.

S601. A slave device receives an IP address sub-segment sent by a master device, and uses the IP address sub-segment as a DHCP server address, where the IP address sub-segment includes at least one IP address.

S602. The slave device allocates an IP address to a user according to the DHCP server address.

That is, the master device directly sends the IP address sub-segment to the slave device, and the IP address sub-segment includes the at least one IP address. In this way, the slave device can directly allocate, to a user device, an IP address in the IP address sub-segment allocated by the master device.

In this embodiment, the slave device receives the IP address sub-segment sent by the master device, uses the IP address sub-segment as the DHCP server address, and may allocate the IP address to the user according to the DHCP server address. In this way, the slave device can directly allocate the IP address to the user device, so that an IP address allocation time is greatly reduced, and communication efficiency of the master-slave network is improved.

Further, in some cases, the slave device further needs to actively request the master device to allocate the IP address sub-segment. For example, a new UD accesses the network, an IP address needs to be allocated, but there is no allocatable IP address in the DHCP server address; or a UD requests allocation of a specific IP address, but the specific IP address is not in an allocatable IP address of the slave device. This is not limited herein.

Specifically:

(1) Before the slave device receives a first IP address sub-segment sent by the master device, the slave device may send an IP address sub-segment request message to the master device, and the IP address sub-segment request message is used for requesting the master device to allocate N IP address sub-segments to the slave device. N is a positive integer.

(2) Before the slave device receives an IP address sub-segment sent by the master device, the slave device may send a specific IP address sub-segment request message to the master device, and the IP address sub-segment request message carries an identifier of a specific IP address sub-segment required by the slave device, and is used for requesting the master device to allocate the specific IP address sub-segment to the slave device.

For example, the UD requests the slave device to allocate an IP address A, and the slave device checks an allocatable DHCP server address of the slave device, and finds that there is no IP address A in the DHCP server address. In this case, the slave device may request the master device to allocate a specific IP address sub-segment that includes the IP address A.

Compared with a prior-art SD, the SD does not need an IP address, and therefore the SD usually does not apply, as a requester, for an IP address from the MD.

Figure 7:
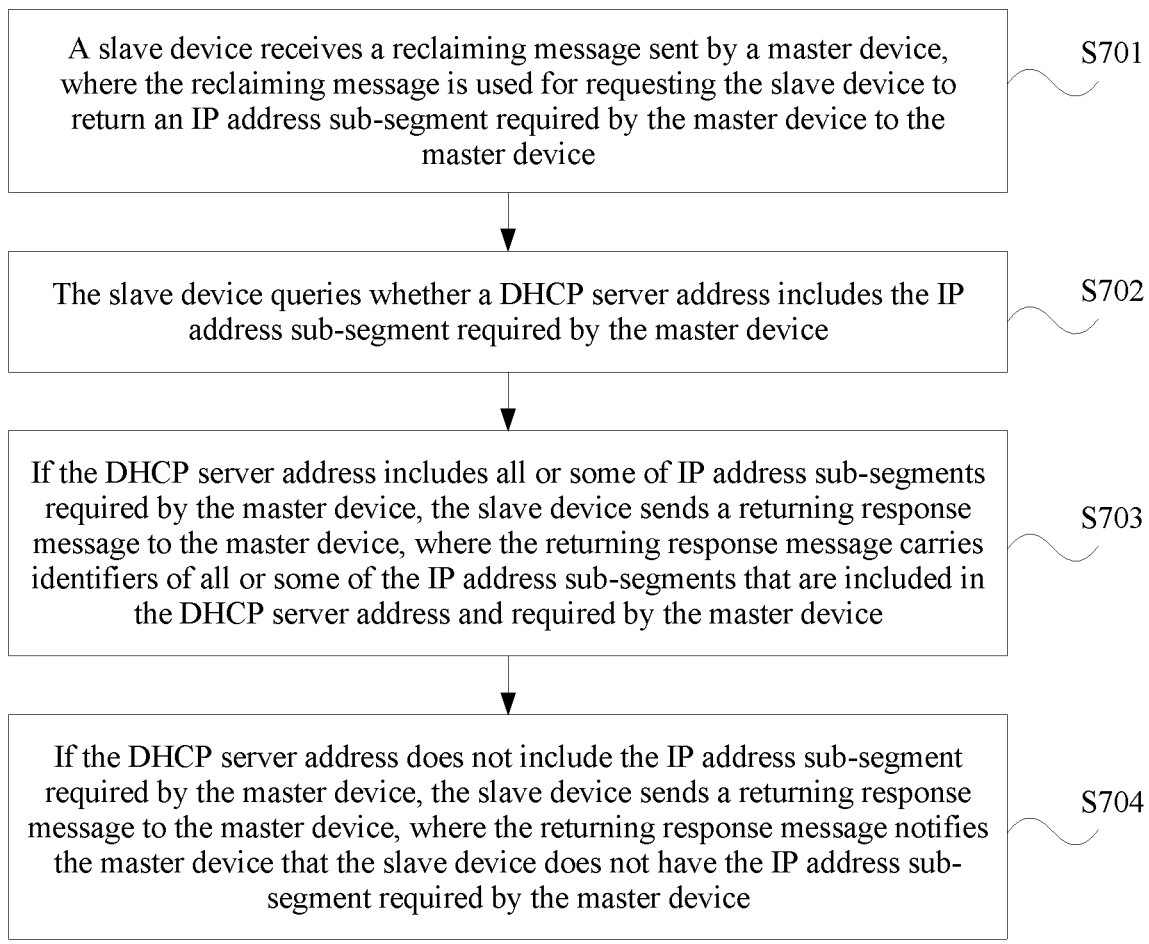
FIG. 7 is a schematic flowchart of Embodiment 6 of an IP address allocation method for a master-slave network according to the present invention.

FIG. 7 is a schematic flowchart of Embodiment 6 of an IP address allocation method for a master-slave network according to the present invention. As shown in FIG. 7, based on the embodiment shown in FIG. 6, the method further includes the following steps.

S701. The slave device receives a reclaiming message sent by the master device, where the reclaiming message is used for requesting the slave device to return an IP address sub-segment required by the master device to the master device.

S702. The slave device queries whether the DHCP server address includes the IP address sub-segment required by the master device.

S703. If the DHCP server address includes all or some of IP address sub-segments required by the master device, the slave device sends a returning response message to the master device, where the returning response message carries identifiers of all or some of the IP address sub-segments that are included in the DHCP server address and required by the master device. Certainly, the slave device may not return the IP address sub-segment required by the master device, and a procedure ends.

S704. If the DHCP server address does not include the IP address sub-segment required by the master device, the slave device sends a returning response message to the master device, where the returning response message notifies the master device that the slave device does not have the IP address sub-segment required by the master device.

In a specific implementation process, at least the following cases are included.

(1) The reclaiming message carries an identifier of at least one IP address sub-segment that needs to be reclaimed by the master device.

Correspondingly, the foregoing S702 may be specifically: The slave device queries whether the DHCP server address includes all or some of the at least one IP address sub-segment that needs to be reclaimed by the master device.

S703 is specifically: If the DHCP server address includes all or some of the at least one IP address sub-segment that needs to be reclaimed by the master device, the slave device sends the returning response message to the master device, where the returning response message carries identifiers of all or some of the at least one IP address sub-segment that needs to be reclaimed by the master device and that is included in the DHCP.

In this case, if the IP address sub-segment that needs to be reclaimed by the master device has been allocated to the UD, the slave device may not respond to the master device, or may notify the master device that reclaiming fails.

(2) The reclaiming message carries a quantity N of IP address sub-segments that need to be reclaimed by the master device, where N is a positive integer.

Correspondingly, the foregoing S702 may be specifically: The slave device queries a quantity of allocatable IP address sub-segments in the DHCP server address.

S703 is specifically: If the quantity of allocatable IP address sub-segments in the DHCP server address is n, and n is a positive integer greater than or equal to N, the slave device sends the returning response message to the master device, where the returning response message carries identifiers of the N allocatable IP address sub-segments in the DHCP server address. It should be noted that, if the slave device has set a threshold k, and k is a positive integer, that is, the slave device needs to have no less than k allocatable IP address sub-segments, the slave device returns the N IP address sub-segments to the master device only when n is greater than or equal to N+k.

Alternatively, S703 is specifically: If the quantity of allocatable IP address sub-segments in the DHCP server address is n, and n is a positive integer less than N, the slave device sends the returning response message to the master device, where the returning response message carries identifiers of the n allocatable IP address sub-segments in the DHCP server address. In this case, the master device further needs N-n IP address sub-segments, and the master device continues to request to reclaim an IP address sub-segment from another slave device in the management area.

Based on the foregoing embodiment, the UD may actively request the slave device to allocate an IP address, that is, the slave device receives a request message sent by the user device. The request message is used for requesting the slave device to allocate the IP address to the user device.

Specifically, at least the following two cases may be further included.

1. The slave device receives a first request message sent by the user device, where the first request message is used for requesting the slave device to allocate a new IP address to the user device. That is, if a UD accesses the network, and no IP address has been allocated to the UD before, a new IP address needs to be allocated.

Correspondingly, the foregoing S602 specifically includes: The slave device queries whether there is an allocatable IP address in the DHCP server address; and if yes, the slave device allocates an IP address in the allocatable IP address to the user device; or if no, the slave device first requests the master device to allocate a new IP address sub-segment, and after receiving the new IP address sub-segment allocated by the master device, the slave device allocates an IP address in the new IP address sub-segment to the user device.

Alternatively,

2. The slave device receives a second request message sent by the user device, where the second request message carries an identifier of a first IP address that has been allocated to the user device before, and the second request message is used for requesting the slave device to allocate the first IP address to the user device for reusing. That is, the first IP address has been allocated to the UD before, and the UD requests to reuse the IP address instead of requiring a new IP address.

Correspondingly, the foregoing S602 specifically includes: The slave device queries whether an allocatable IP address in the DHCP server address includes the first IP address; and if yes, the slave device marks the first IP address as allocated; or if no, the slave device requests the master device to allocate an IP address sub-segment that includes the first IP address, and after receiving the IP address sub-segment that is allocated by the master device and that includes the first IP address, the slave device marks the IP address as allocated. Specifically, after receiving the IP address sub-segment that is allocated by the master device and that includes the first IP address, the slave device first updates the allocatable IP address in the DHCP server address of the slave device, and then marks the first IP address in the DHCP server address as allocated.

In the foregoing embodiment, when the slave device requests allocation of the IP address sub-segment that includes the first IP address, if the master device has the IP address sub-segment that includes the first IP address, the slave device may directly allocate the IP address sub-segment to the slave device, and if the master device does not have the IP address sub-segment that includes the first IP address, the master device reclaims the IP address sub-segment that includes the first IP address from another slave device. If a slave device has the IP address sub-segment that includes the first IP address, the slave device may directly return the entire IP address sub-segment that includes the first IP address to the master device. There is also a special case, for example, a slave device has the first IP address, but an original IP address sub-segment in which the first IP address is located does not exist because, for example, another IP address has been allocated, the slave device may return only the first IP address to the master device, and the master device generates a new IP address sub-segment according to the first IP address, and then sends the IP address sub-segment to the slave device.

It should be noted that, in the master-slave network, the master device is connected to the slave device by using a wide area network (Wide Area Network, WAN for short) interface, that is, a logic interface or a physical interface that connects the SD device and the MD device is usually defined as the WAN interface. In an IP network, generally, no IP address is allocated to the WAN interface. In a specific implementation process, after receiving a request message that is sent by the UD for requesting IP address allocation, the SD first determines whether the message is from the WAN interface, and if yes, the SD ignores the request message, or if no, the SD allocates an IP address to the UD according to the foregoing procedure.

One MD, two SDs (a first SD and a second SD), and two UDs (a first UD and a second UD) are used as an example below to describe an IP address allocation method for a master-slave network according to an embodiment of the present invention. The first SD and the second SD are SDs in a management area of the MD.

Figure 8A:
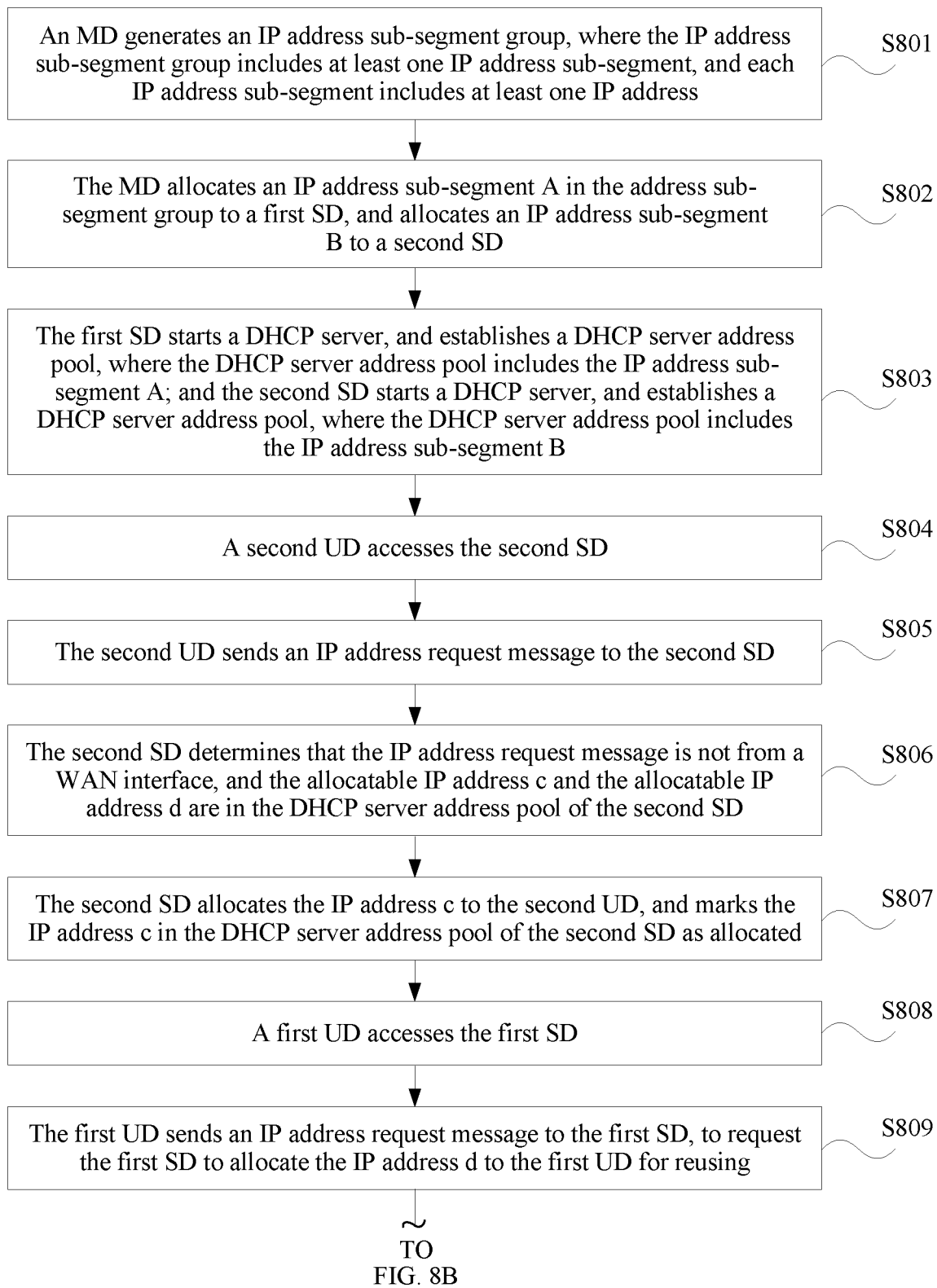
FIG. 8A and FIG. 8B are a schematic flowchart of Embodiment 7 of an IP address allocation method for a master-slave network according to the present invention.
Figure 8B:
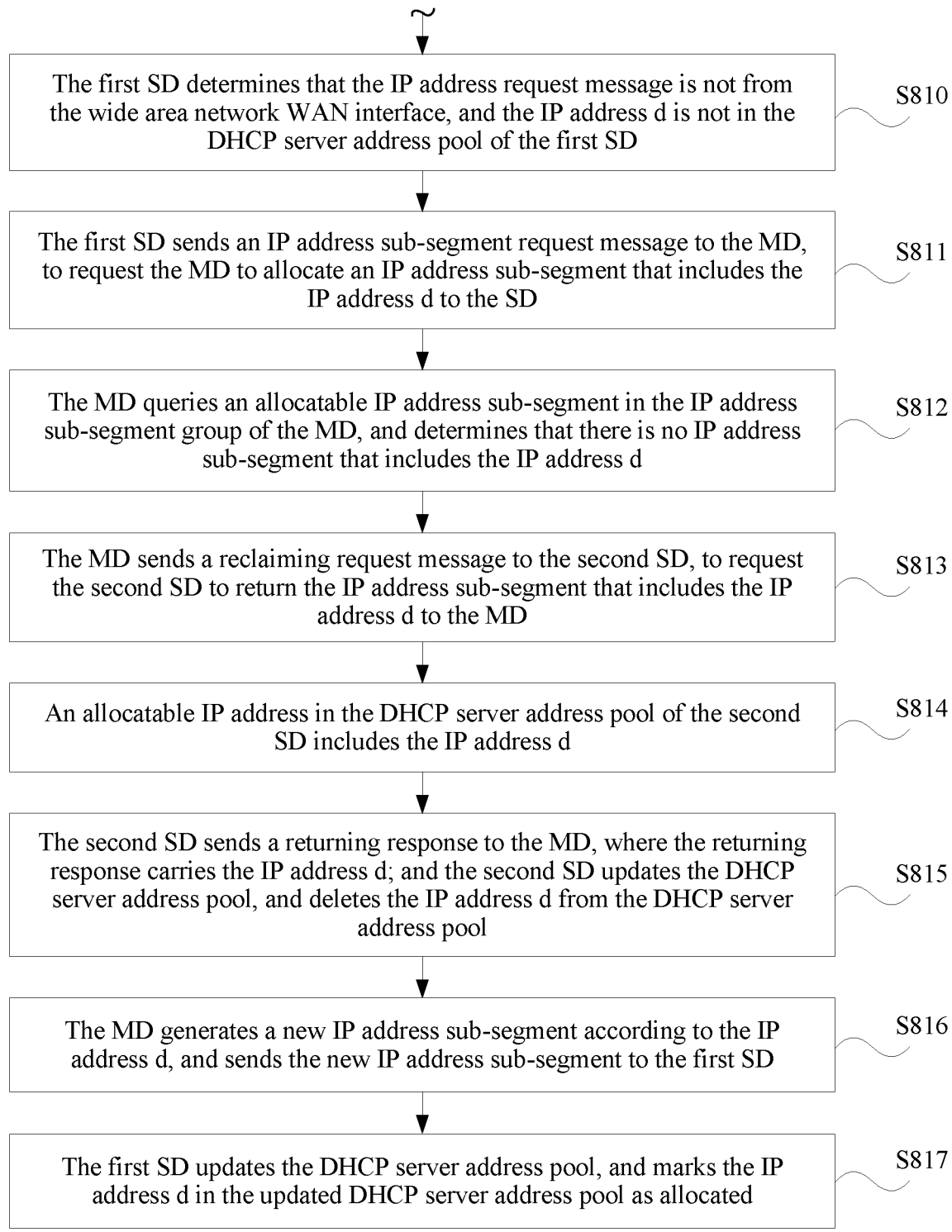

FIG. 8A and FIG. 8B are a schematic flowchart of Embodiment 7 of an IP address allocation method for a master-slave network according to the present invention. As shown in FIG. 8A and FIG. 8B, an interaction procedure of the IP address allocation method for the master-slave network may be as follows:

S801. An MD generates an IP address sub-segment group, where the IP address sub-segment group includes at least one IP address sub-segment, and each IP address sub-segment includes at least one IP address.

S802. The MD allocates an IP address sub-segment A in the address sub-segment group to a first SD, and allocates an IP address sub-segment B to a second SD.

Specifically, the IP address sub-segment A includes an IP address a3 and an IP address b4, and the IP address sub-segment B includes an IP address c and an IP address d.

S803. The first SD starts a DHCP server, and establishes a DHCP server address pool, where the DHCP server address pool includes the IP address sub-segment A; and the second SD starts a DHCP server, and establishes a DHCP server address pool, where the DHCP server address pool includes the IP address sub-segment B.

S804. A second UD accesses the second SD.

Specifically, the second UD is a UD to which an IP address can be allocated.

S805. The second UD sends an IP address request message to the second SD.

S806. The second SD determines that the IP address request message is not from a WAN interface, and the allocatable IP address c and the allocatable IP address d are in the DHCP server address pool of the second SD.

S807. The second SD allocates the IP address c to the second UD, and marks the IP address c in the DHCP server address pool of the second SD as allocated.

S808. A first UD accesses the first SD.

Specifically, the first UD is a UD to which an IP address has been allocated before, and the IP address allocated to the first UD is the IP address d.

S809. The first UD sends an IP address request message to the first SD, to request the first SD to allocate the IP address d to the first UD for reusing.

S810. The first SD determines that the IP address request message is not from the wide area network WAN interface, and the IP address d is not in the DHCP server address pool of the first SD.

S811. The first SD sends an IP address sub-segment request message to the MD, to request the MD to allocate an IP address sub-segment that includes the IP address d to the SD.

S812. The MD queries an allocatable IP address sub-segment in the IP address sub-segment group of the MD, and determines that there is no IP address sub-segment that includes the IP address d.

S813. The MD sends a reclaiming request message to the second SD, to request the second SD to return the IP address sub-segment that includes the IP address d to the MD.

S814. An allocatable IP address in the DHCP server address pool of the second SD includes the IP address d.

S815. The second SD sends a returning response to the MD, where the returning response carries the IP address d; and the second SD updates the DHCP server address pool, and deletes the IP address d from the DHCP server address pool.

S816. The MD generates a new IP address sub-segment according to the IP address d, and sends the new IP address sub-segment to the first SD.

S817. The first SD updates the DHCP server address pool, and marks the IP address d in the updated DHCP server address pool as allocated.

It should be noted that FIG. 8A and FIG. 8B are merely an example of a specific embodiment, and the present invention is not limited to this example.

In a specific implementation process, after the network is powered on, the MD generates the IP address sub-segment group, that is, divides an IP address of the MD into several IP address sub-segments, and after the SD joins an autonomous network controlled by the MD, the MD allocates an IP address sub-segment in the IP address sub-segment group of the MD to the SD.

Figure 9:
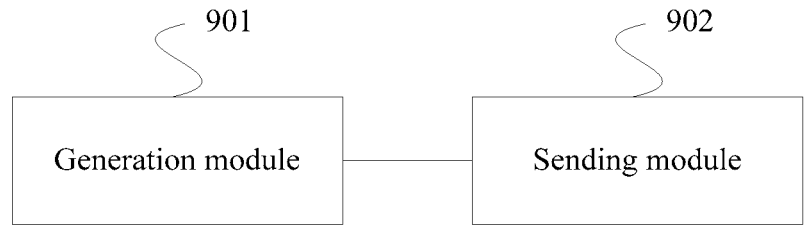
FIG. 9 is a schematic structural diagram of Embodiment 1 of a master device according to the present invention.

FIG. 9 is a schematic structural diagram of Embodiment 1 of a master device according to the present invention. The master device is the master device in the foregoing master-slave network. As shown in FIG. 9, the master device includes a generation module 901 and a sending module 902.

The generation module 901 is configured to generate an address sub-segment group, where the IP address sub-segment group includes at least one IP address sub-segment, and each IP address sub-segment includes at least one IP address.

The sending module 902 is configured to separately send the at least one IP address sub-segment in the IP address sub-segment group to the at least one slave device, so that the at least one slave device uses the received IP address sub-segment as a DHCP server address, and allocates an IP address to a user device according to the DHCP server address.

Figure 10:
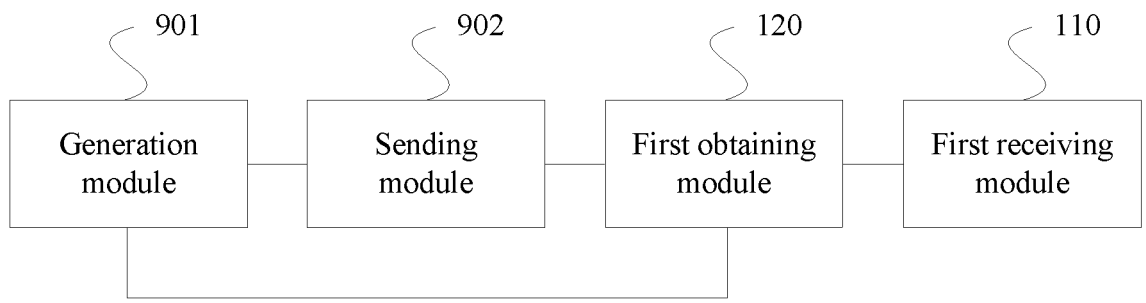
FIG. 10 is a schematic structural diagram of Embodiment 2 of a master device according to the present invention.

FIG. 10 is a schematic structural diagram of Embodiment 2 of a master device according to the present invention. As shown in FIG. 10, the master device further includes a first receiving module 110 and a first obtaining module 120. Specifically, based on the foregoing embodiment, the first receiving module 110 is configured to: before the sending module 902 separately sends the at least one IP address sub-segment in the IP address sub-segment group to the at least one slave device, receive an IP address sub-segment request message sent by the slave device, where the IP address sub-segment request message is used for requesting the master device to allocate N IP address sub-segments to the slave device, and N is a positive integer; and the first obtaining module 120 is configured to: if there are N allocatable IP address sub-segments in the IP address sub-segment group, obtain the N IP address sub-segments from the allocatable IP address sub-segments; or if there are no N allocatable IP address sub-segments in the IP address sub-segment group, reclaim an allocatable IP address sub-segment from another slave device in a management area of the master device until there are N allocatable IP address sub-segments in the IP address sub-segment group, and obtain the N IP address sub-segments from the allocatable IP address sub-segments.

Figure 11:
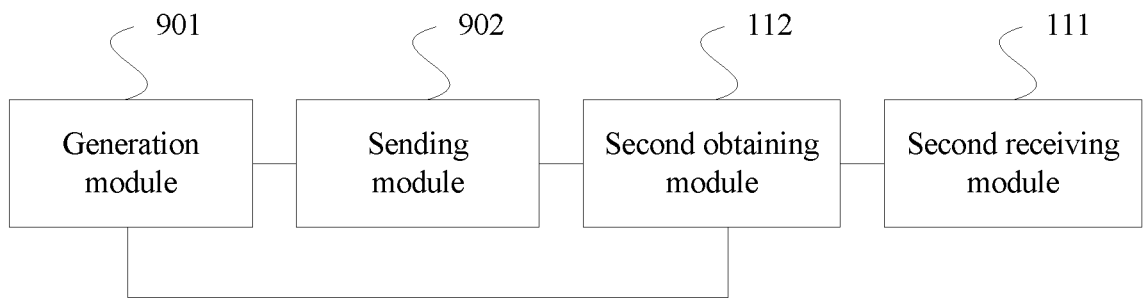
FIG. 11 is a schematic structural diagram of Embodiment 3 of a master device according to the present invention.

FIG. 11 is a schematic structural diagram of Embodiment 3 of a master device according to the present invention. As shown in FIG. 11, the master device further includes a second receiving module 111 and a second obtaining module 112. Specifically:

The second receiving module 111 is configured to: before the sending module 902 separately sends the at least one IP address sub-segment in the IP address sub-segment group to the at least one slave device, receive a specific IP address sub-segment request message sent by the slave device, where the IP address sub-segment request message carries an identifier of a specific IP address sub-segment required by the slave device, and is used for requesting the master device to allocate the specific IP address sub-segment to the slave device.

The second obtaining module 112 is configured to: if there is the specific IP address sub-segment in an allocatable IP address sub-segment in the IP address sub-segment group, obtain the specific IP address sub-segment; or if there is not the specific IP address sub-segment in an allocatable IP address sub-segment in the IP address sub-segment group, reclaim the specific IP address sub-segment from another slave device in a management area of the master device, and obtain the reclaimed specific IP address sub-segment.

Figure 12:
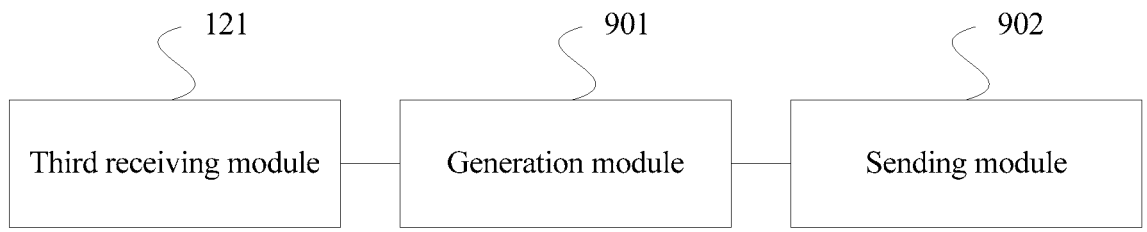
FIG. 12 is a schematic structural diagram of Embodiment 4 of a master device according to the present invention.

FIG. 12 is a schematic structural diagram of Embodiment 4 of a master device according to the present invention. As shown in FIG. 12, the master device further includes a third receiving module 121. The embodiment shown in FIG. 12 may also include the first receiving module 110 and the first obtaining module 120, or includes the second receiving module 111 and the second obtaining module 112.

Specifically:

the sending module 902 is further configured to send a reclaiming message to the at least one slave device, where the reclaiming message is used for requesting the slave device to return the IP address sub-segment required by the master device to the master device; and the third receiving module 121 is configured to receive a returning response message sent by the slave device according to the reclaiming message, where the returning response message carries identifiers of all or some of IP address sub-segments that are required by the master device and returned by the slave device, or the returning response message indicates that the slave device does not have the IP address sub-segment required by the master device.

The master device is configured to perform the method embodiment performed by the foregoing master device. Implementation principles and technical effects of the master device are similar to those in the method embodiment. Details are not described herein again.

Figure 13:
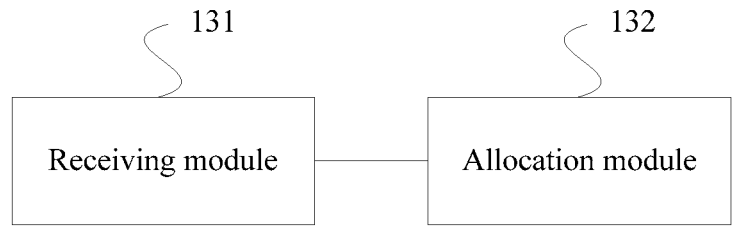
FIG. 13 is a schematic structural diagram of Embodiment 1 of a slave device according to the present invention.

FIG. 13 is a schematic structural diagram of Embodiment 1 of a slave device according to the present invention. The slave device is the slave device in the foregoing master-slave network. As shown in FIG. 13, the slave device includes a receiving module 131 and an allocation module 132.

The receiving module 131 is configured to: receive an IP address sub-segment sent by a master device, and use the IP address sub-segment as a Dynamic Host Configuration Protocol DHCP server address, where the IP address sub-segment includes at least one IP address.

The allocation module 132 is configured to allocate an IP address to a user device according to the DHCP server address.

Figure 14:
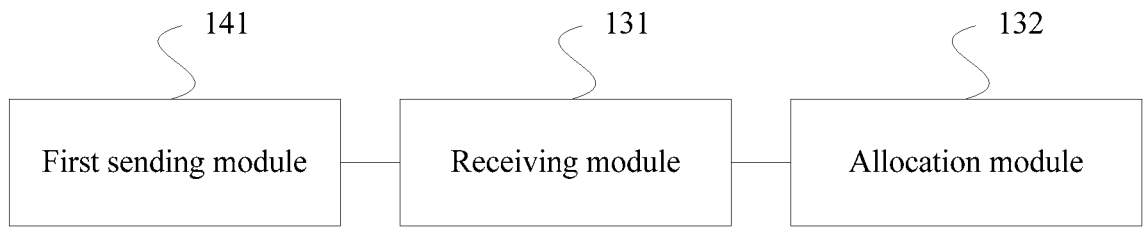
FIG. 14 is a schematic structural diagram of Embodiment 2 of a slave device according to the present invention.

FIG. 14 is a schematic structural diagram of Embodiment 2 of a slave device according to the present invention. As shown in FIG. 14, based on FIG. 13, the slave device further includes a first sending module 141.

The first sending module 141 is configured to: before the receiving module 131 receives the IP address sub-segment sent by the master device, send an IP address sub-segment request message to the master device, where the IP address sub-segment request message is used for requesting the master device to allocate N IP address sub-segments to the slave device, and N is a positive integer.

Figure 15:
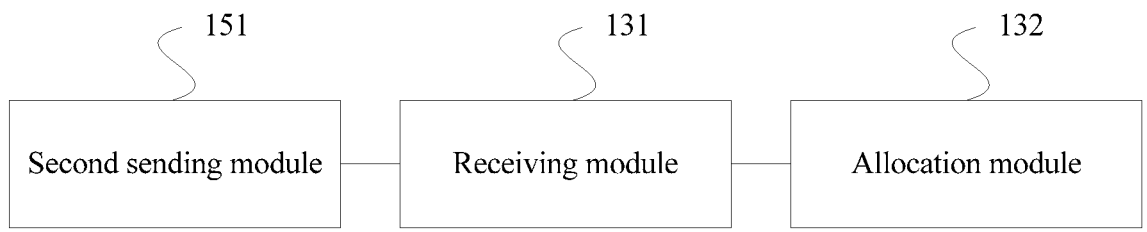
FIG. 15 is a schematic structural diagram of Embodiment 3 of a slave device according to the present invention.

FIG. 15 is a schematic structural diagram of Embodiment 3 of a slave device according to the present invention. As shown in FIG. 15, based on FIG. 13, the slave device further includes a second sending module 151.

The second sending module 151 is configured to: before the receiving module 131 receives the IP address sub-segment sent by the master device, send a specific IP address sub-segment request message to the master device, where the IP address sub-segment request message carries an identifier of a specific IP address sub-segment required by the slave device, and is used for requesting the master device to allocate the specific IP address sub-segment to the slave device.

Figure 16:
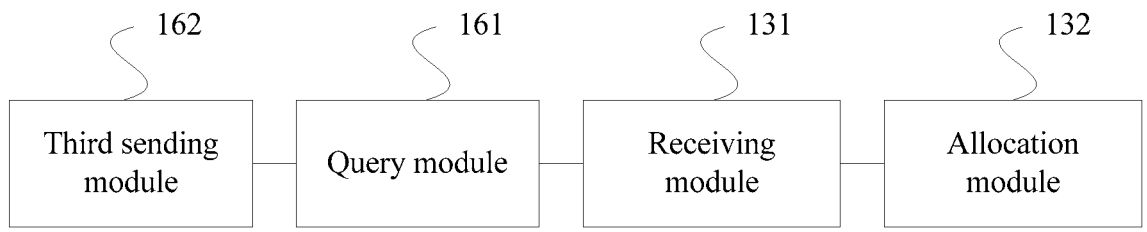
FIG. 16 is a schematic structural diagram of Embodiment 4 of a slave device according to the present invention.

FIG. 16 is a schematic structural diagram of Embodiment 4 of a slave device according to the present invention. As shown in FIG. 16, based on the foregoing embodiment, the slave device may further include a query module 161 and a third sending module 162. The first sending module 141 or the second sending module 151 may also be included in FIG. 16.

The receiving module 131 is further configured to receive a reclaiming message sent by the master device, where the reclaiming message is used for requesting the slave device to return the IP address sub-segment required by the master device to the master device.

The query module 161 is configured to query whether the DHCP server address includes the IP address sub-segment required by the master device.

The third sending module 162 is configured to: if the DHCP server address includes all or some of IP address sub-segments required by the master device, send a returning response message to the master device, where the returning response message carries identifiers of all or some of the IP address sub-segments that are included in the DHCP server address and required by the master device; or if the DHCP server address does not include the IP address sub-segment required by the master device, send a returning response message to the master device, where the returning response message notifies the master device that the slave device does not have the IP address sub-segment required by the master device.

Further, based on the foregoing embodiment, the receiving module 131 is further configured to receive a request message sent by the user device, where the request message is used for requesting the slave device to allocate the IP address to the user device.

Figure 17:
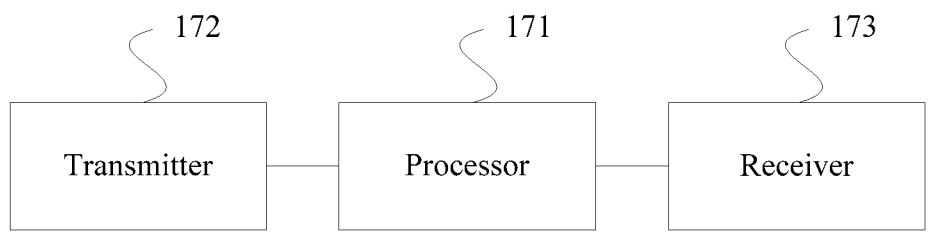
FIG. 17 is a schematic structural diagram of Embodiment 5 of a master device according to the present invention.

FIG. 17 is a schematic structural diagram of Embodiment 5 of a master device according to the present invention. The master device is the master device in the foregoing master-slave network. As shown in FIG. 17, the master device includes a processor 171 and a transmitter 172.

The processor 171 is configured to generate an Internet Protocol IP address sub-segment group, where the IP address sub-segment group includes at least one IP address sub-segment, and each IP address sub-segment includes at least one IP address.

The transmitter 172 is configured to separately send the at least one IP address sub-segment in the IP address sub-segment group to the at least one slave device, so that the at least one slave device uses the received IP address sub-segment as a Dynamic Host Configuration Protocol DHCP server address, and allocates an IP address to a user device according to the DHCP server address.

Further, referring to FIG. 17, the master device further includes a receiver 173, configured to: before the transmitter 172 separately sends the at least one IP address sub-segment in the IP address sub-segment group to the at least one slave device, receive an IP address sub-segment request message sent by the slave device, where the IP address sub-segment request message is used for requesting the master device to allocate N IP address sub-segments to the slave device, and N is a positive integer.

If there are N allocatable IP address sub-segments in the IP address sub-segment group, the processor 171 obtains the N IP address sub-segments from the allocatable IP address sub-segments. If there are no N allocatable IP address sub-segments in the IP address sub-segment group, the processor 171 reclaims an allocatable IP address sub-segment from another slave device in a management area of the master device until there are N allocatable IP address sub-segments in the IP address sub-segment group, obtains the N IP address sub-segments from the allocatable IP address sub-segments. Specifically, in a reclaiming process, the processor 171 may send a request by using the transmitter 172, and receive a response by using the receiver 173, and the like.

Correspondingly, the transmitter 172 sends the obtained N allocatable IP address sub-segments to the slave device.

In another embodiment, the receiver 173 is configured to receive a specific IP address sub-segment request message sent by the slave device, where the IP address sub-segment request message carries an identifier of a specific IP address sub-segment required by the slave device, and is used for requesting the master device to allocate the specific IP address sub-segment to the slave device.

If there is the specific IP address sub-segment in an allocatable IP address sub-segment in the IP address sub-segment group, the processor 171 obtains the specific IP address sub-segment. If there is not the specific IP address sub-segment in an allocatable IP address sub-segment in the IP address sub-segment group, the processor 171 reclaims the specific IP address sub-segment from another slave device in a management area of the master device, and obtains the reclaimed specific IP address sub-segment.

In a specific implementation process, the transmitter 172 is further configured to send a reclaiming message to the at least one slave device, where the reclaiming message is used for requesting the slave device to return the IP address sub-segment required by the master device to the master device.

The receiver is configured to receive a returning response message sent by the slave device according to the reclaiming message, where the returning response message carries identifiers of all or some of IP address sub-segments that are required by the master device and returned by the slave device, or the returning response message indicates that the slave device does not have the IP address sub-segment required by the master device.

The master device is configured to perform the method embodiment corresponding to the foregoing master device. Implementation principles and technical effects of the master device are similar to those in the method embodiment. Details are not described herein again.

Figure 18:
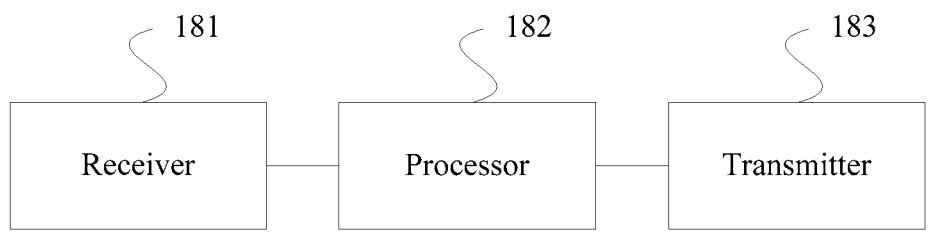
FIG. 18 is a schematic structural diagram of Embodiment 5 of a slave device according to the present invention.

FIG. 18 is a schematic structural diagram of Embodiment 5 of a slave device according to the present invention. The slave device is the slave device in the foregoing master-slave network. As shown in FIG. 18, the slave device includes a receiver 181 and a processor 182.

The receiver 181 is configured to: receive an IP address sub-segment sent by a master device, and use the IP address sub-segment as a DHCP server address, where the IP address sub-segment includes at least one IP address.

The processor 182 is configured to allocate an IP address to a user device according to the DHCP server address.

Further, in another embodiment, referring to FIG. 18, the slave device may further include a transmitter 183.

The transmitter 183 is configured to: before the receiver 181 receives the IP address sub-segment sent by the master device, send an IP address sub-segment request message to the master device, where the IP address sub-segment request message is used for requesting the master device to allocate N IP address sub-segments to the slave device, and N is a positive integer.

In another embodiment, the transmitter 183 is configured to: before the receiver 181 receives the IP address sub-segment sent by the master device, send a specific IP address sub-segment request message to the master device, where the IP address sub-segment request message carries an identifier of a specific IP address sub-segment required by the slave device, and is used for requesting the master device to allocate the specific IP address sub-segment to the slave device.

Accordingly, the receiver 181 is specifically configured to: receive the specific IP address sub-segment allocated by the master device, and use the specific IP address sub-segment as the DHCP server address.

Further, the receiver 181 is further configured to receive a reclaiming message sent by the master device, where the reclaiming message is used for requesting the slave device to return the IP address sub-segment required by the master device to the master device.

The processor 182 is configured to query whether the DHCP server address includes the IP address sub-segment required by the master device.

The transmitter 183 is configured to: if the DHCP server address includes all or some of IP address sub-segments required by the master device, send a returning response message to the master device, where the returning response message carries identifiers of all or some of the IP address sub-segments that are included in the DHCP server address and required by the master device; or if the DHCP server address does not include the IP address sub-segment required by the master device, send a returning response message to the master device, where the returning response message notifies the master device that the slave device does not have the IP address sub-segment required by the master device.

Based on the foregoing embodiment, the receiver 161 is further configured to receive a request message sent by the user device, where the request message is used for requesting the slave device to allocate the IP address to the user device.

Persons of ordinary skill in the art may understand that all or some of the steps of the method embodiments may be implemented by program instructing relevant hardware. The program may be stored in a computer readable storage medium. When the program runs, the steps of the method embodiments are performed. The foregoing storage medium includes various media that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An Internet Protocol (IP) address allocation method for a master-slave network, wherein the master-slave network comprises a master device and at least one slave device in a management area of the master device, and the method comprises:
   generating, by the master device, an IP address sub-segment group, wherein the IP address sub-segment group comprises a plurality of IP address sub-segments, and each IP address sub-segment of the plurality of IP address sub-segments comprises at least one IP address, and wherein generating the IP address sub-segment group comprises:
      dividing an IP address segment into the plurality of IP address sub-segments, and
      grouping the plurality of IP address sub-segments into the IP address sub-segment group;
   separately sending, by the master device, at least one IP address sub-segment of the plurality of IP address sub-segments in the IP address sub-segment group to the at least one slave device, wherein the at least one IP address sub-segment is used as a Dynamic Host Configuration Protocol (DHCP) server address, on which an IP address is allocated to a user device based;
   sending, by the master device, a reclaiming message to the at least one slave device, wherein the reclaiming message is used for requesting the at least one slave device to return the IP address sub-segment required by the master device to the master device; and
   receiving, by the master device, a returning response message sent by the at least one slave device according to the reclaiming message, wherein the returning response message carries identifiers of all or some of IP address sub-segments that are required by the master device and returned by the at least one slave device, or the returning response message indicates that the at least one slave device does not have the IP address sub-segment required by the master device.

2. The IP address allocation method according to claim 1, before the separately sending, by the master device, the at least one IP address sub-segment in the IP address sub-segment group to the at least one slave device, further comprising:
   receiving, by the master device, an IP address sub-segment request message sent by the at least one slave device, wherein the IP address sub-segment request message is used for requesting the master device to allocate N IP address sub-segments to the at least one slave device, and N is a positive integer; and
   obtaining, by the master device, the N IP address sub-segments from allocatable IP address sub-segments of the plurality of IP address sub-segments in response to determining that there are N allocatable IP address sub-segments in the IP address sub-segment group; or
   reclaiming, by the master device, an allocatable IP address sub-segment from another slave device in the management area of the master device in response to determining that there are no N allocatable IP address sub-segments in the IP address sub-segment group, until there are N allocatable IP address sub-segments in the IP address sub-segment group, and obtaining, by the master device, the N IP address sub-segments from the allocatable IP address sub-segments.

3. The IP address allocation method according to claim 1, before the separately sending, by the master device, the at least one IP address sub-segment in the IP address sub-segment group to the at least one slave device, further comprising:
   receiving, by the master device, a specific IP address sub-segment request message sent by the at least one slave device, wherein the specific IP address sub-segment request message carries an identifier of a specific IP address sub-segment required by the at least one slave device, and is used for requesting the master device to allocate the specific IP address sub-segment to the at least one slave device; and
   obtaining, by the master device, the specific IP address sub-segment in response to determining that there is the specific IP address sub-segment in an allocatable IP address sub-segment in the IP address sub-segment group.

4. The IP address allocation method according to claim 1, before the separately sending, by the master device, the at least one IP address sub-segment in the IP address sub-segment group to the at least one slave device, further comprising:
   receiving, by the master device, a specific IP address sub-segment request message sent by the at least one slave device, wherein the specific IP address sub-segment request message carries an identifier of a specific IP address sub-segment required by the at least one slave device, and is used for requesting the master device to allocate the specific IP address sub-segment to the at least one slave device; and
   reclaiming, by the master device, the specific IP address sub-segment from another slave device in the management area of the master device in response to determining that there is not the specific IP address sub-segment in an allocatable IP address sub-segment in the IP address sub-segment group, and obtaining, by the master device, the reclaimed specific IP address sub-segment.

5. A master device, wherein the master device belongs to a master-slave network, the master-slave network comprises the master device and at least one slave device in a management area of the master device, and the master device comprises:
   at least one processor;
   a non-transitory computer-readable storage medium coupled to the at least one processor and storing programming instructions for execution by the at least one processor, the programming instructions instruct the at least one processor to generate an Internet Protocol (IP) address sub-segment group, wherein the IP address sub-segment group comprises a plurality of IP address sub-segments, and each IP address sub-segment of the plurality of IP address sub-segments comprises at least one IP address, and wherein generating the IP address sub-segment group comprises:
dividing an IP address segment into the plurality of IP address sub-segments, and
grouping the plurality of IP address sub-segments into the IP address sub-segment group;
a transmitter, configured to:
separately send at least one IP address sub-segment of the plurality of IP address sub-segments in the IP address sub-segment group to the at least one slave device, wherein the at least one IP address sub-segment is used as a Dynamic Host Configuration Protocol (DHCP) server address, on which an IP address is allocated to a user device based; and
send a reclaiming message to the at least one slave device, wherein the reclaiming message is used for requesting the at least one slave device to return the IP address sub-segment required by the master device to the master device; and
a receiver, configured to receive a returning response message sent by the at least one slave device according to the reclaiming message, wherein the returning response message carries identifiers of all or some of IP address sub-segments that are required by the master device and returned by the at least one slave device, or the returning response message indicates that the at least one slave device does not have the IP address sub-segment required by the master device.

6. The master device according to claim 5, wherein the receiver is configured to: before the transmitter separately sends the at least one IP address sub-segment in the IP address sub-segment group to the at least one slave device, receive an IP address sub-segment request message sent by the at least one slave device, wherein the IP address sub-segment request message is used for requesting the master device to allocate N IP address sub-segments to the at least one slave device, and N is a positive integer; and
wherein the programming instructions instruct the at least one processor to: obtain the N IP address sub-segments from allocatable IP address sub-segments of the plurality of IP address sub-segments in response to determining that there are N allocatable IP address sub-segments in the IP address sub-segment group; or reclaim an allocatable IP address sub-segment from another slave device in the management area of the master device in response to determining that there are no N allocatable IP address sub-segments in the IP address sub-segment group, until there are N allocatable IP address sub-segments in the IP address sub-segment group, and obtain the N IP address sub-segments from the allocatable IP address sub-segments.

7. The master device according to claim 5, wherein the receiver is configured to: before the transmitter separately sends the at least one IP address sub-segment in the IP address sub-segment group to the at least one slave device, receive a specific IP address sub-segment request message sent by the at least one slave device, wherein the specific IP address sub-segment request message carries an identifier of a specific IP address sub-segment required by the at least one slave device, and is used for requesting the master device to allocate the specific IP address sub-segment to the at least one slave device; and
wherein the programming instructions instruct the at least one processor to: obtain the specific IP address sub-segment in response to determining that there is the specific IP address sub-segment in an allocatable IP address sub-segment in the IP address sub-segment group.

8. The master device according to claim 5, wherein the receiver is configured to: before the transmitter separately sends the at least one IP address sub-segment in the IP address sub-segment group to the at least one slave device, receive a specific IP address sub-segment request message sent by the at least one slave device, wherein the specific IP address sub-segment request message carries an identifier of a specific IP address sub-segment required by the at least one slave device, and is used for requesting the master device to allocate the specific IP address sub-segment to the at least one slave device; and
wherein the programming instructions instruct the at least one processor to reclaim the specific IP address sub-segment from another slave device in the management area of the master device in response to determining that there is not the specific IP address sub-segment in an allocatable IP address sub-segment in the IP address sub-segment group, and obtain the reclaimed specific IP address sub-segment.

9. A slave device, wherein the slave device belongs to a master-slave network, the master-slave network comprises a master device and at least one slave device in a management area of the master device, and the slave device comprises:
a transmitter;
a receiver, configured to: receive an IP address sub-segment of a plurality of IP address sub-segments in an IP address sub-segment group sent by the master device, wherein an IP address segment has been divided into the plurality of IP address sub-segments by the master device, and wherein the plurality of IP address sub-segments have been grouped into the IP address sub-segment group by the master device;
at least one processor; and
a non-transitory computer-readable storage medium coupled to the at least one processor and storing programming instructions for execution by the at least one processor, the programming instructions instruct the at least one processor to:
use the IP address sub-segment of the plurality of IP address sub-segments as a Dynamic Host Configuration Protocol (DHCP) server address, wherein the IP address sub-segment comprises at least one IP address; and
wherein the programming instructions instruct the at least one processor to allocate an IP address to a user device according to the DHCP server address;
wherein the receiver is further configured to receive a reclaiming message sent by the master device, wherein the reclaiming message is used for requesting the slave device to return the IP address sub-segment required by the master device to the master device;
wherein the programming instructions instruct the at least one processor to query whether the DHCP server address comprises the IP address sub-segment required by the master device; and
wherein the transmitter is further configured to:
send a returning response message to the master device in response to determining that the DHCP server address comprises all or some of IP address sub-segments required by the master device, wherein the returning response message carries identifiers of all or some of the IP address sub-segments that are comprised in the DHCP server address and required by the master device; or send a returning response message to the master device in response to determining that the DHCP server address does not comprise the IP address sub-segment required by the master device, wherein the returning response message notifies the master device that the slave device does not have the IP address sub-segment required by the master device.

10. The slave device according to claim 9, wherein the transmitter is configured to: before the receiver receives the IP address sub-segment sent by the master device, send an IP address sub-segment request message to the master device, wherein the IP address sub-segment request message is used for requesting the master device to allocate N IP address sub-segments to the slave device, and N is a positive integer.

11. The slave device according to claim 9, wherein the transmitter is configured to: before the receiver receives the IP address sub-segment sent by the master device, send a specific IP address sub-segment request message to the master device, wherein the specific IP address sub-segment request message carries an identifier of a specific IP address sub-segment required by the slave device, and is used for requesting the master device to allocate the specific IP address sub-segment to the slave device.

12. The slave device according to of claim 9, wherein the receiver is further configured to receive a request message sent by the user device, wherein the request message is used for requesting the slave device to allocate the IP address to the user device.

13. The slave device according to claim 10, wherein the receiver is further configured to receive a reclaiming message sent by the master device, wherein the reclaiming message is used for requesting the slave device to return the IP address sub-segment required by the master device to the master device;

wherein the programming instructions instruct the at least one processor to query whether the DHCP server address comprises the IP address sub-segment required by the master device; and the transmitter is further configured to: send a returning response message to the master device in response to determining that the DHCP server address comprises all or some of IP address sub-segments required by the master device, wherein the returning response message carries identifiers of all or some of the IP address sub-segments that are comprised in the DHCP server address and required by the master device; or send a returning response message to the master device in response to determining that the DHCP server address does not comprise the IP address sub-segment required by the master device, wherein the returning response message notifies the master device that the slave device does not have the IP address sub-segment required by the master device.

* * * * *

UNITED STATES PATENT AND TRADEMARK OFFICE
CERTIFICATE OF CORRECTION

PATENT NO. : 10,757,069 B2  
APPLICATION NO. : 15/764270  
DATED : August 25, 2020  
INVENTOR(S) : Chong Zhu, Xin Lv and Jun Yang Page 1 of 1

It is certified that error appears in the above-identified patent and that said Letters Patent is hereby corrected as shown below:

In the Claims

In Column 29, Line 24, in Claim 12, delete "to of" and insert -- to --, therefor.

In Column 30, Lines 1-27, in Claim 13, delete "The slave device according to claim 10, wherein the receiver is further configured to receive a reclaiming message sent by the master device, wherein the reclaiming message is used for requesting the slave device to return the IP address sub-segment required by the master device to the master device; wherein the programming instructions instruct the at least one processor to query whether the DHCP server address comprises the IP address sub-segment required by the master device; and the transmitter is further configured to: send a returning response message to the master device in response to determining that the DHCP server address comprises all or some of IP address subsegments required by the master device, wherein the returning response message carries identifiers of all or some of the IP address sub-segments that are comprised in the DHCP server address and required by the master device; or send a returning response message to the master device in response to determining that the DHCP server address does not comprise the IP address subsegment required by the master device, wherein the returning response message notifies the master device that the slave device does not have the IP address sub-segment required by the master device." and insert -- The slave device according to claim 10, wherein the receiver is further configured to receive a request message sent by the user device, wherein the request message is used for requesting the slave device to allocate the IP address to the user device. --, therefor.

Signed and Sealed this  
Twentieth Day of April, 2021

Drew Hirshfeld  
*Performing the Functions and Duties of the*  
*Under Secretary of Commerce for Intellectual Property and*  
*Director of the United States Patent and Trademark Office*